(12) United States Patent
Dudley et al.

(10) Patent No.: US 10,328,909 B1
(45) Date of Patent: Jun. 25, 2019

(54) SNOW REMOVAL DEVICE FOR AN AUTOMOBILE

(71) Applicants: Frank Dudley, Sallisaw, OK (US);
Linda Dudley, Sallisaw, OK (US)

(72) Inventors: Frank Dudley, Sallisaw, OK (US);
Linda Dudley, Sallisaw, OK (US)

( * ) Notice: Subject to any disclaimer, the term of this patent is extended or adjusted under 35 U.S.C. 154(b) by 0 days.

(21) Appl. No.: 15/341,274

(22) Filed: Nov. 2, 2016

(51) Int. Cl.
*B60S 3/04* (2006.01)

(52) U.S. Cl.
CPC ..................... *B60S 3/045* (2013.01)

(58) Field of Classification Search
CPC ..................................... B60S 3/045
See application file for complete search history.

(56) References Cited

U.S. PATENT DOCUMENTS

| | | | |
|---|---|---|---|
| 4,024,654 A | 5/1977 | Snyder | |
| 7,861,361 B2 * | 1/2011 | Boucher | B60S 3/045 |
| | | | 15/160 |
| 9,296,364 B2 * | 3/2016 | Grano | B60S 3/045 |

* cited by examiner

*Primary Examiner* — Shay Karls

(57) ABSTRACT

A snow removal device for an automobile including a rectangular flexible sheet and each of a front seam and a back seam disposed within the rectangular flexible sheet. Each of a front cord and a back cord of a pair of cords is continuously disposed through an entirety of each of the front seam and the back seam, respectively. Each of a plurality of stitchings permanently affixes one of the pair of cords to the rectangular flexible sheet. Each of a right handle and a left handle of a pair of rigid handles is attached to the pair of cords. One of the pair of handles is configured to be held by one of a pair of users in order to allow the pair of users to brush snow off the automobile using the rectangular flexible sheet.

3 Claims, 5 Drawing Sheets

SNOW REMOVAL DEVICE FOR AN AUTOMOBILE

BACKGROUND OF THE INVENTION

Various types of snow removal devices are known in the prior art. However, what has been needed is a snow removal device for an automobile including a rectangular flexible sheet and each of a front seam and a back seam disposed within the rectangular flexible sheet. What has been further needed is for each of a front cord and a back cord of a pair of cords to be continuously disposed through an entirety of each of the front seam and the back seam, respectively, with each of a plurality of stitchings permanently affixing one of the pair of cords to the rectangular flexible sheet. Lastly, what has been needed is for each of a right handle and a left handle of a pair of rigid handles to be attached to the pair of cords. One of the pair of handles is configured to be held by one of a pair of users in order to allow the pair of users to brush snow off the automobile using the rectangular flexible sheet. The snow removal device for an automobile thus quickly and efficiently removes snow from an automobile in order to ensure that drivers remain safe and in compliance with state laws regarding snow removal.

FIELD OF THE INVENTION

The present invention relates to snow removal devices, and more particularly, to a snow removal device for an automobile.

SUMMARY OF THE INVENTION

The general purpose of the present snow removal device for an automobile, described subsequently in greater detail, is to provide a snow removal device for an automobile which has many novel features that result in a snow removal device for an automobile which is not anticipated, rendered obvious, suggested, or even implied by prior art, either alone or in combination thereof.

To accomplish this, the present snow removal device for an automobile includes an elongated rectangular flattened flexible sheet, optionally a waterproof tarp, having a front edge, a back edge, a right edge, a left edge, a front right corner, a front left corner, a back right corner, and a back left corner. A front seam is continuously disposed within an entirety of the front edge of the elongated rectangular flattened flexible sheet from the right edge to the left edge, and a back seam is continuously disposed within an entirety of the back edge of the elongated rectangular flattened flexible sheet from the right edge to the left edge. Each of a front cord and a back cord of a pair of cords has a right end and a left end. Each of the front cord and the back cord is continuously disposed through an entirety of each of the front seam and the back seam, respectively, and each of the right end and the left end is outwardly extended from each of the right edge and the left edge, respectively, of the elongated rectangular flattened flexible sheet.

The snow removal device for an automobile further includes a plurality of stitchings disposed within the elongated rectangular flattened flexible sheet. Each of the plurality of stitchings permanently affixes one of the pair of cords to the elongated rectangular flattened flexible sheet. Each of a right handle and a left handle of a pair of rigid handles has a front surface and a back surface. Each of the pair of rigid handles is optionally polyvinyl chloride for greater durability and strength. The front surface of each of the right handle and the left handle is attached to each of the right end and the left end, respectively, of the front cord, and the back surface of each of the right handle and the left handle is attached to each of the right end and the left end, respectively, of the back cord.

A length of the elongated rectangular flattened flexible sheet from the right edge to the left edge substantially conforms to a width of a hood of an automobile from a right area of the automobile to a left area of the automobile. One of the pair of handles is configured to be held by one of a pair of users in order to allow the pair of users to brush snow off the automobile using the elongated rectangular flattened flexible sheet. The elongated rectangular flattened flexible sheet is foldable for ease of storage and transport.

Thus has been broadly outlined the more important features of the present snow removal device for an automobile so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
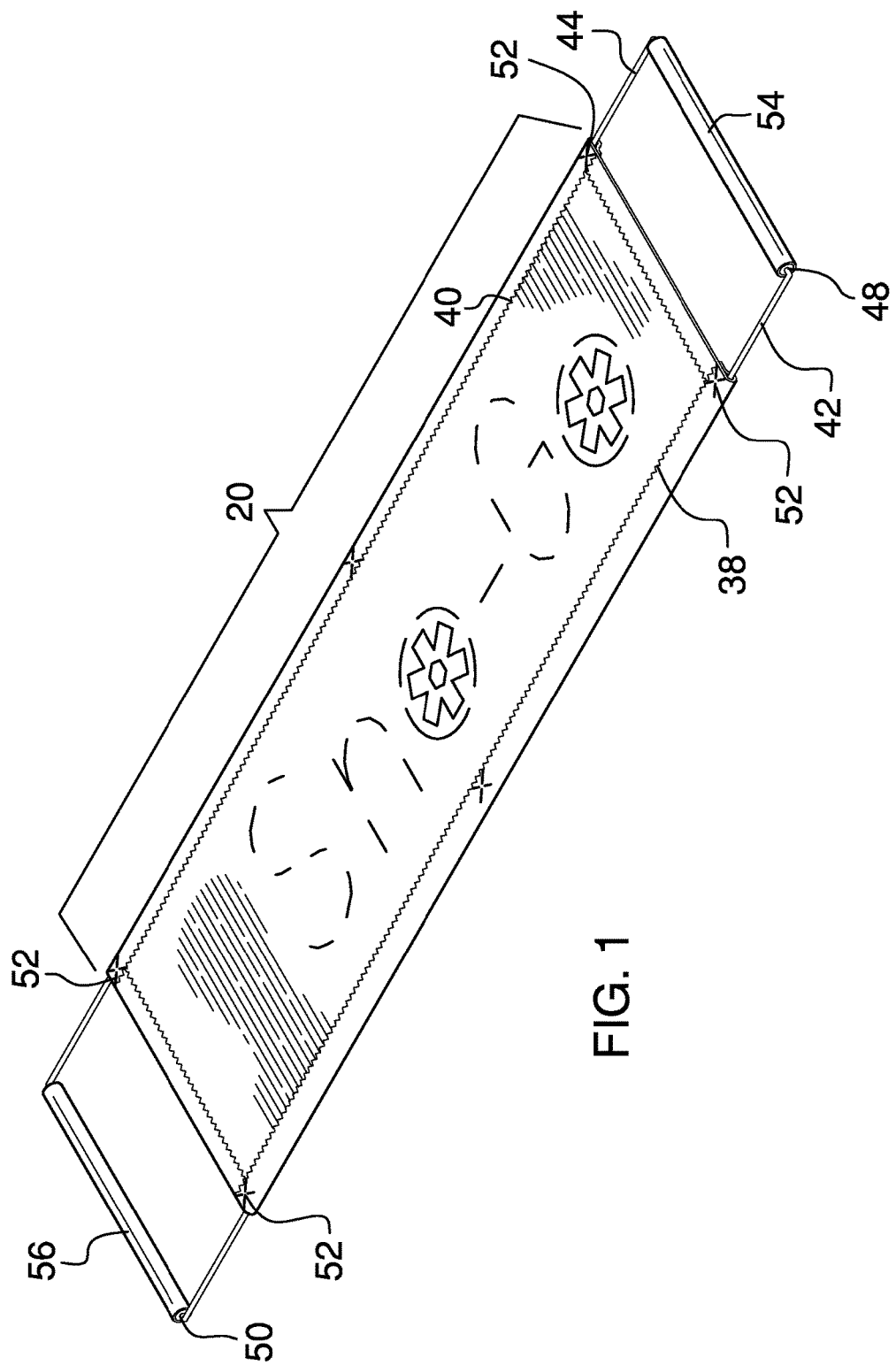
FIG. 1 is a front isometric view.
Figure 2:
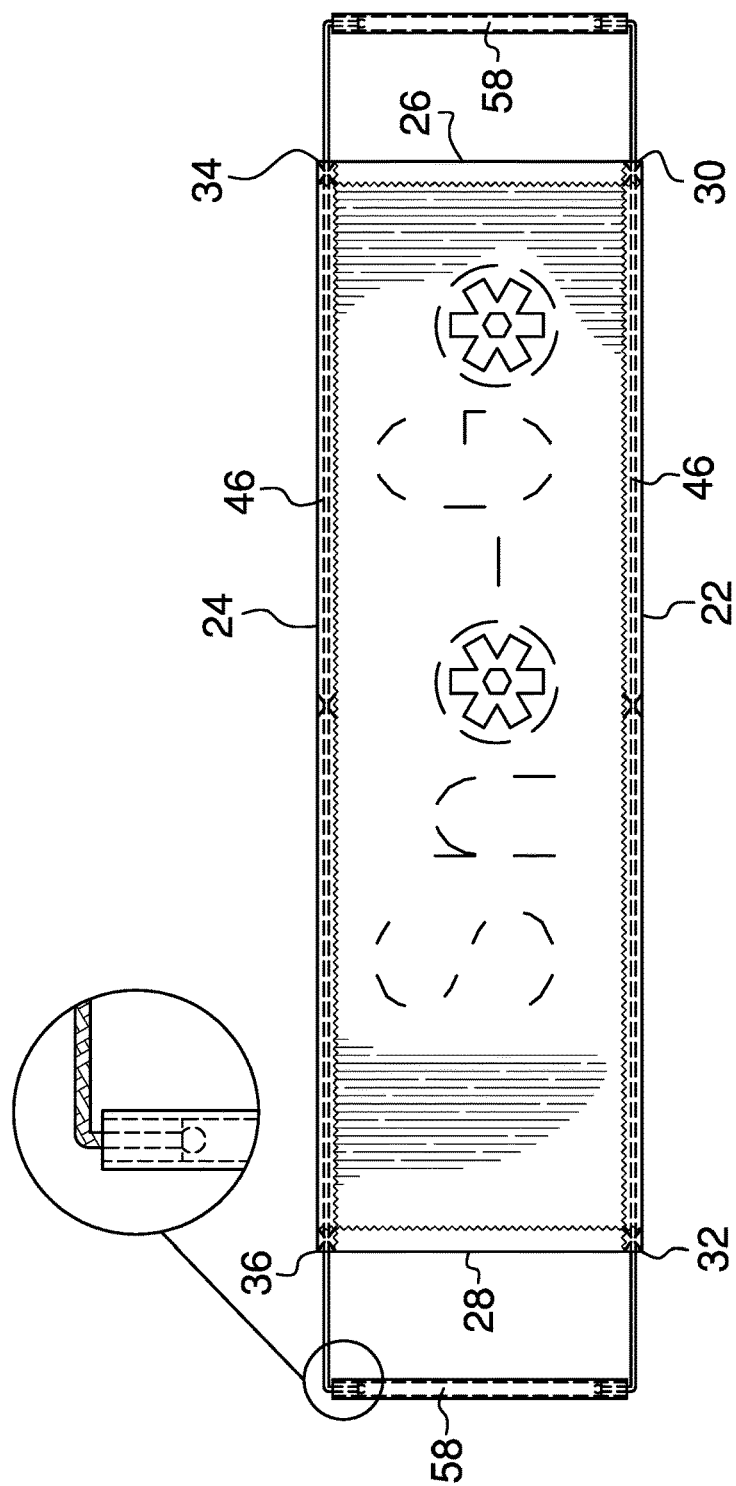
FIG. 2 is a top plan view.
Figure 3:
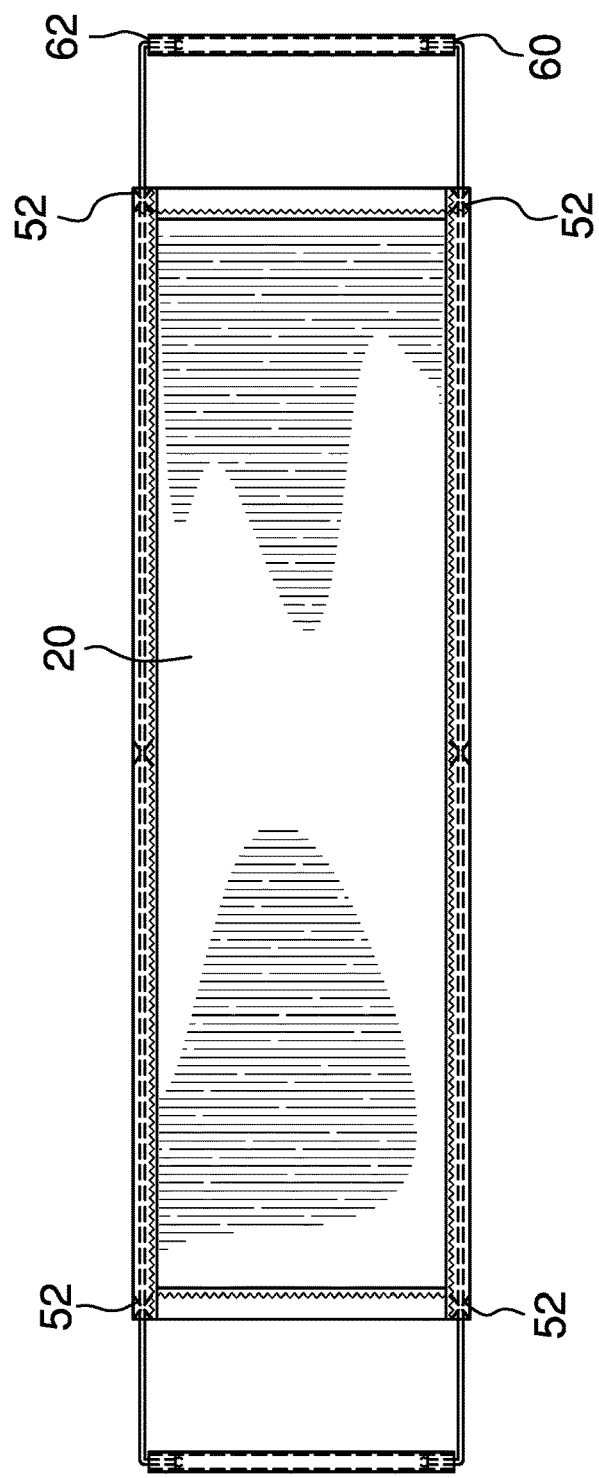
FIG. 3 is a bottom plan view.
Figure 4:
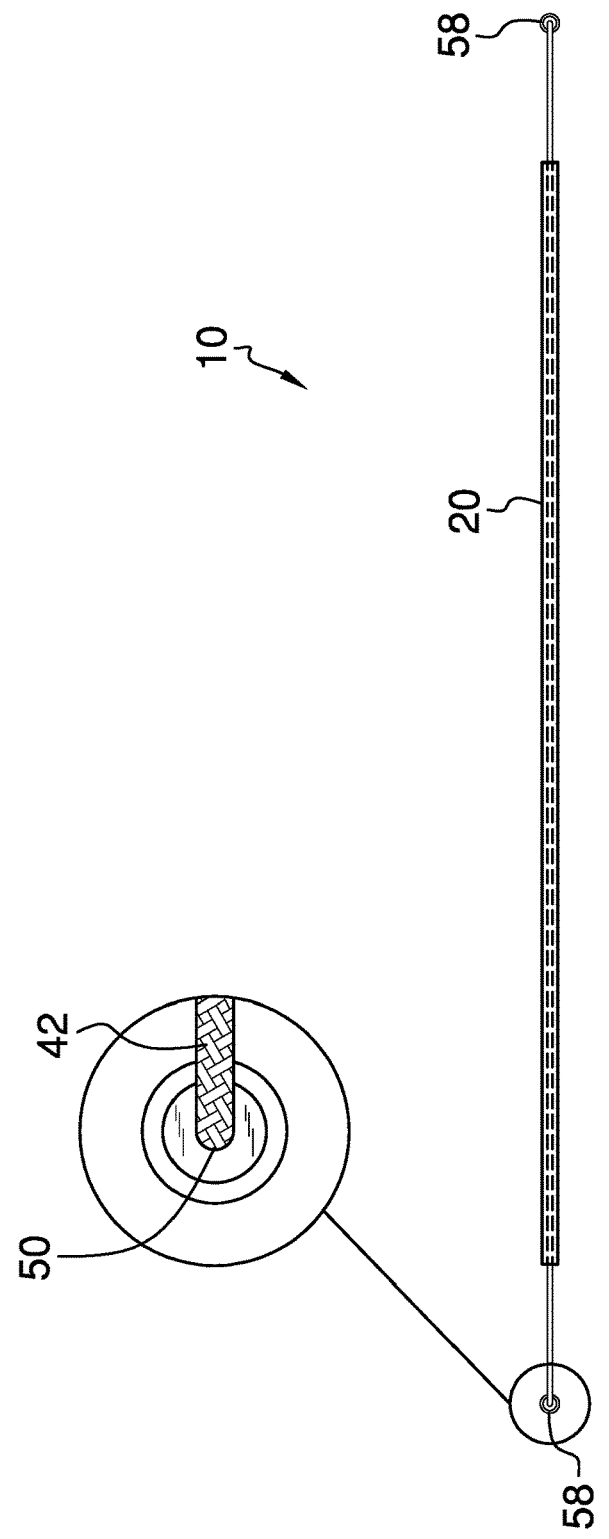
FIG. 4 is a side elevation view.
Figure 5:
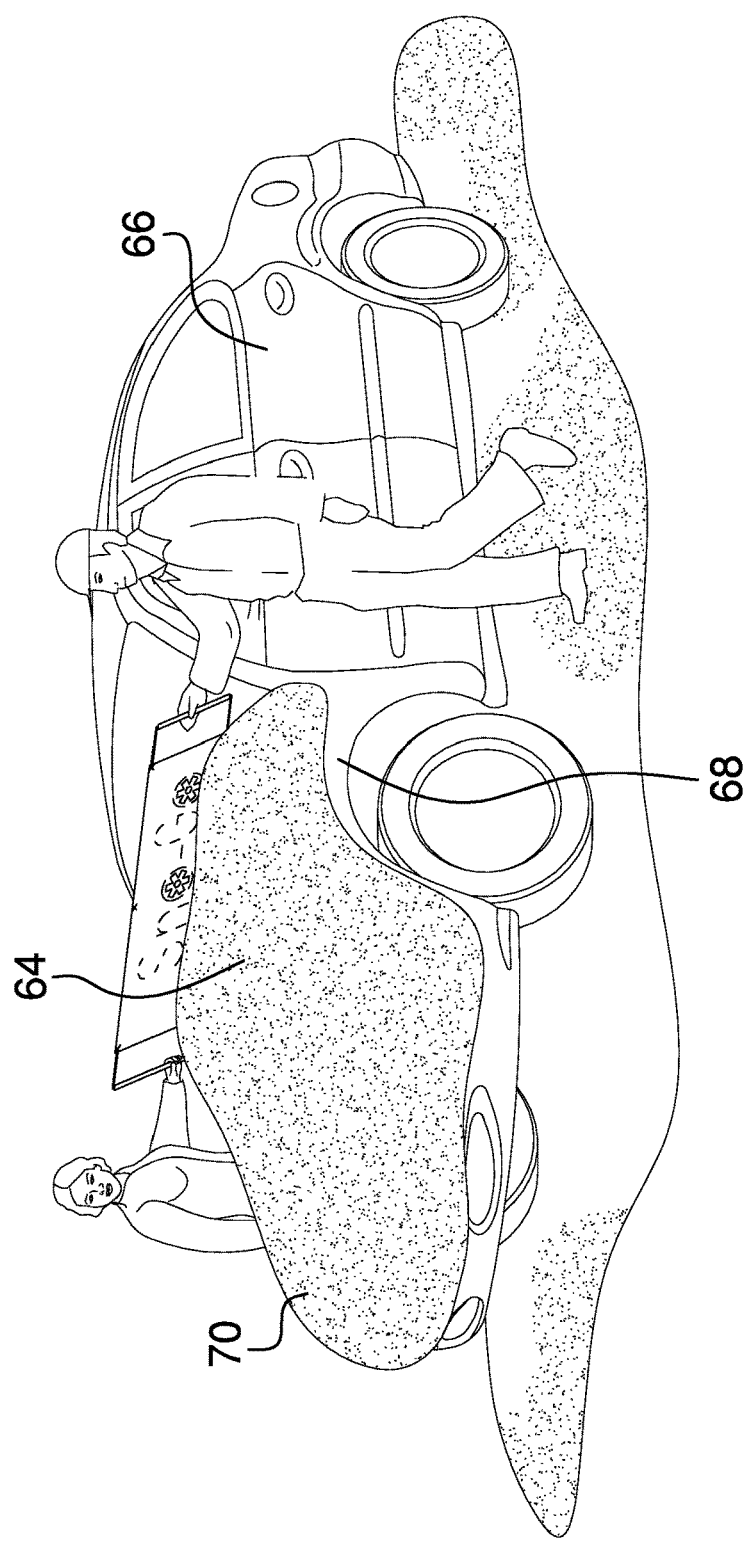
FIG. 5 is an in use view.

With reference now to the drawings, and in particular FIGS. 1 through 5 thereof, an example of the instant snow removal device for an automobile employing the principles and concepts of the present snow removal device for an automobile and generally designated by the reference number 10 will be described.

Referring to FIGS. 1 through 5 the present snow removal device for an automobile 10 is illustrated. The snow removal device for an automobile 10 includes an elongated rectangular flattened flexible sheet 20, optionally a waterproof tarp, having a front edge 22, a back edge 24, a right edge 26, a left edge 28, a front right corner 30, a front left corner 32, a back right corner 34, and a back left corner 36. A front seam 38 is continuously disposed within an entirety of the front edge 22 of the elongated rectangular flattened flexible sheet 20 from the right edge 26 to the left edge 28, and a back seam 40 is continuously disposed within an entirety of the back edge 24 of the elongated rectangular flattened flexible sheet 20 from the right edge 26 to the left edge 28. Each of a front cord 42 and a back cord 44 of a pair of cords 46 has a right end 48 and a left end 50. Each of the front cord 42 and the back cord 44 is continuously disposed through an entirety of each of the front seam 38 and the back seam 40, respectively, and each of the right end 48 and the left end 50 is outwardly extended from each of the right edge 26 and the left edge 28, respectively, of the elongated rectangular flattened flexible sheet 20.

The snow removal device for an automobile 10 further includes a plurality of stitchings 52 disposed within the elongated rectangular flattened flexible sheet 20. Each of the plurality of stitchings 52 permanently affixes one of the pair of cords 46 to the elongated rectangular flattened flexible sheet 20. Each of a right handle 54 and a left handle 56 of a pair of rigid handles 58 has a front surface 60 and a back surface 62. The front surface 60 of each of the right handle 54 and the left handle 56 is attached to each of the right end 48 and the left end 50, respectively, of the front cord 42, and the back surface 62 of each of the right handle 54 and the left handle 56 is attached to each of the right end 48 and the left end 50, respectively, of the back cord 44.

A length of the elongated rectangular flattened flexible sheet 20 from the right edge 26 to the left edge 28 substantially conforms to a width of a hood 64 of an automobile 66 from a right area 68 of the automobile 66 to a left area 70 of the automobile 66.

What is claimed is:

1. A snow removal device for an automobile comprising:
   an elongated rectangular flattened flexible sheet having a front edge, a back edge, a right edge, a left edge, a front right corner, a front left corner, a back right corner, and a back left corner;
   a front seam continuously disposed within an entirety of the front edge of the elongated rectangular flattened flexible sheet from the right edge to the left edge;
   a back seam continuously disposed within an entirety of the back edge of the elongated rectangular flattened flexible sheet from the right edge to the left edge;
   a pair of cords comprising a front cord and a back cord, each of the front cord and the back cord having a right end and a left end, wherein each of the front cord and the back cord is continuously disposed through an entirety of each of the front seam and the back seam, respectively, wherein each of the right end and the left end is outwardly extended from each of the right edge and the left edge, respectively, of the elongated rectangular flattened flexible sheet;
   a plurality of stitchings disposed within the elongated rectangular flattened flexible sheet, wherein each of the plurality of stitchings permanently affixes one of the pair of cords to the elongated rectangular flattened flexible sheet;
   a pair of rigid handles comprising a right handle and a left handle, each of the right handle and the left handle having a front surface and a back surface wherein the front surface of each of the right handle and the left handle is attached to each of the right end and the left end, respectively, of the front cord, wherein the back surface of each of the right handle and the left handle is attached to each of the right end and the left end, respectively, of the back cord, a length of each of said pair of handles being equivalent to a length of each of said right edge and said left edge of said elongated rectangular flattened flexible sheet;
   wherein a length of the elongated rectangular flattened flexible sheet from the right edge to the left edge substantially conforms to a width of a hood of an automobile from a right area of the automobile to a left area of the automobile; and
   wherein one of the pair of rigid handles is configured to be held by one of a pair of users in order to allow the pair of users to brush snow off the automobile using the elongated rectangular flattened flexible sheet.

2. The snow removal device for an automobile of claim 1 wherein the elongated rectangular flattened flexible sheet is a waterproof tarp.

3. The snow removal device for an automobile of claim 2 wherein each of the pair of rigid handles is polyvinyl chloride.

* * * * *